(12) United States Patent
Rao (10) Patent No.: US 7,865,363 B2
(45) Date of Patent: Jan. 4, 2011

(54) SYSTEM AND METHOD FOR COMPUTER RECOGNITION AND INTERPRETATION OF ARBITRARY SPOKEN-CHARACTERS

(76) Inventor: Ashwin Rao, 225 112th Ave. NE. #335, Bellevue, WA (US) 98004

( * ) Notice: Subject to any disclaimer, the term of this patent is extended or adjusted under 35 U.S.C. 154(b) by 1500 days.

(21) Appl. No.: 11/074,613

(22) Filed: Mar. 8, 2005

(65) Prior Publication Data

US 2005/0203742 A1  Sep. 15, 2005

Related U.S. Application Data

(60) Provisional application No. 60/551,466, filed on Mar. 9, 2004.

(51) Int. Cl.
  *G10L 15/04*  (2006.01)
(52) U.S. Cl. ..................... 704/251
(58) Field of Classification Search ...... 704/251–256.8, 704/275
  See application file for complete search history.

(56) References Cited

U.S. PATENT DOCUMENTS

| | | | |
|---|---|---|---|
| 6,064,959 A * | 5/2000 | Young et al. ............. 704/251 |
| 6,321,196 B1 * | 11/2001 | Franceschi .............. 704/243 |
| 6,601,027 B1 * | 7/2003 | Wright et al. ............ 704/235 |
| 6,629,071 B1 * | 9/2003 | Mann ................... 704/251 |
| 6,694,296 B1 * | 2/2004 | Alleva et al. ............ 704/255 |
| 6,934,683 B2 * | 8/2005 | Ju et al. ................ 704/257 |
| 6,975,986 B2 * | 12/2005 | Hartley et al. ........... 704/254 |
| 7,006,971 B1 * | 2/2006 | Stahl et al. ............. 704/242 |
| 7,143,037 B1 * | 11/2006 | Chestnut ............... 704/251 |
| 7,149,970 B1 * | 12/2006 | Pratley et al. ........... 715/257 |
| 2002/0138265 A1 * | 9/2002 | Stevens et al. .......... 704/251 |
| 2005/0049858 A1 * | 3/2005 | Busayapongchai ....... 704/231 |

\* cited by examiner

*Primary Examiner*—Jakieda R Jackson (57) ABSTRACT

For improving the accuracy of a speech recognition system, for the specific task of character recognition, the character that is to be recognized or interpreted, is spoken in accordance with this invention, using simple coding-schemes that result in acoustic renderings that are well separated in the acoustic space. Furthermore, to relax the constraint on users for memorizing multiple words associated with multiple characters, in one embodiment, the coding-schemes are defined based on a combination of the given character and its neighboring/succeeding character(s).

21 Claims, 5 Drawing Sheets

DICTIONARY FILE (ASCII-FORMAT) FOR IMPLEMENTING CODING SCHEME OF TABLE I WITH N=2 i.e. FOR A - ABC CODING SCHEME:

---------------BEGIN FILE---------------

| | |
|---|---|
| A | PRONUNCIATION_FOR_A+PRONUNCIATION_FOR_B+PRONUNCIATION_FOR_C |
| B | PRONUNCIATION_FOR_B+PRONUNCIATION_FOR_C+PRONUNCIATION_FOR_D |
| C | PRONUNCIATION_FOR_C+PRONUNCIATION_FOR_D+PRONUNCIATION_FOR_E |
| D | PRONUNCIATION_FOR_D+PRONUNCIATION_FOR_E+PRONUNCIATION_FOR_F |
| E | PRONUNCIATION_FOR_E+PRONUNCIATION_FOR_F+PRONUNCIATION_FOR_G |
| F | PRONUNCIATION_FOR_F+PRONUNCIATION_FOR_G+PRONUNCIATION_FOR_H |
| G | PRONUNCIATION_FOR_G+PRONUNCIATION_FOR_H+PRONUNCIATION_FOR_I |
| H | PRONUNCIATION_FOR_H+PRONUNCIATION_FOR_I+PRONUNCIATION_FOR_J |
| I | PRONUNCIATION_FOR_I+PRONUNCIATION_FOR_J+PRONUNCIATION_FOR_K |
| J | PRONUNCIATION_FOR_J+PRONUNCIATION_FOR_K+PRONUNCIATION_FOR_L |
| K | PRONUNCIATION_FOR_K+PRONUNCIATION_FOR_L+PRONUNCIATION_FOR_M |
| L | PRONUNCIATION_FOR_L+PRONUNCIATION_FOR_M+PRONUNCIATION_FOR_N |
| M | PRONUNCIATION_FOR_M+PRONUNCIATION_FOR_N+PRONUNCIATION_FOR_O |
| N | PRONUNCIATION_FOR_N+PRONUNCIATION_FOR_O+PRONUNCIATION_FOR_P |
| O | PRONUNCIATION_FOR_O+PRONUNCIATION_FOR_P+PRONUNCIATION_FOR_Q |
| P | PRONUNCIATION_FOR_P+PRONUNCIATION_FOR_Q+PRONUNCIATION_FOR_R |
| Q | PRONUNCIATION_FOR_Q+PRONUNCIATION_FOR_R+PRONUNCIATION_FOR_S |
| R | PRONUNCIATION_FOR_R+PRONUNCIATION_FOR_S+PRONUNCIATION_FOR_T |
| S | PRONUNCIATION_FOR_S+PRONUNCIATION_FOR_T+PRONUNCIATION_FOR_U |
| T | PRONUNCIATION_FOR_T+PRONUNCIATION_FOR_U+PRONUNCIATION_FOR_V |
| U | PRONUNCIATION_FOR_U+PRONUNCIATION_FOR_V+PRONUNCIATION_FOR_W |
| V | PRONUNCIATION_FOR_V+PRONUNCIATION_FOR_W+PRONUNCIATION_FOR_X |
| W | PRONUNCIATION_FOR_W+PRONUNCIATION_FOR_X+PRONUNCIATION_FOR_Y |
| X | PRONUNCIATION_FOR_X+PRONUNCIATION_FOR_Y+PRONUNCIATION_FOR_Z |
| Y | PRONUNCIATION_FOR_Y+PRONUNCIATION_FOR_Z+PRONUNCIATION_FOR_A |
| Z | PRONUNCIATION_FOR_Z+PRONUNCIATION_FOR_A+PRONUNCIATION_FOR_B |

---------------END FILE---------------

COMMENT:

1) IN ABOVE FILE, 1$^{ST}$ COLUMN IS THE WORD (IN THIS CASE LETTERS) AND 2$^{ND}$ COLUMN IS ITS PRONUNCIATION.

2) PRONUNCIATION_FOR_A IMPLIES THE PRONUNCIATION FOR WORD/LETTER, "A", WHICH DEPENDS ON THE BASE PHONEMES (AND THEIR SYMBOLS) USED BY THE RECOGNITION SYSTEM...EXAMPLE, SPHINX CMU SYSTEM MAY USE "AY" AS PRONUNCIATION FOR "A", "B IY" AS PRONUNCIATION FOR "B" AND "S IY" AS PRONUNCIATION FOR "C" IN WHICH CASE USING THE CODING SCHEME ABOVE THE PRONUNCIATION FOR "A" BECOMES "AY B IY S IY"

3) THE "+" SIGN DENOTES STRING-CONCATENATION.

FIG. 3

GRAMMAR FILE (BNF-FORMAT) FOR IMPLEMENTING CODING SCHEME OF TABLE 1 WITH $N=2$:

---BEGIN FILE---

```
<WORD> ::= <alphabets>
<alphabets> ::=
    <alphabet> |
    <alphabet> <alphabets>
<alphabet> ::=
    A_B_C |
    B_C_D |
    C_D_E |
    D_E_F |
    E_F_G |
    F_G_H |
    G_H_I |
    H_I_J |
    I_J_K |
    J_K_L |
    K_L_M |
    L_M_N |
    M_N_O |
    N_O_P |
    O_P_Q |
    P_Q_R |
    Q_R_S |
    R_S_T |
    S_T_U |
    T_U_V |
    U_V_W |
    V_W_X |
    W_X_Y |
    X_Y_Z |
    Y_Z_A |
    Z_A_B .
```

---END FILE---

SYSTEM AND METHOD FOR COMPUTER RECOGNITION AND INTERPRETATION OF ARBITRARY SPOKEN-CHARACTERS

CROSS REFERENCE TO RELATED APPLICATIONS

This application is entitled to the benefit of Provisional Application Ser. No. 60/551,466 filed Mar. 9, 2004.

FIELD OF THE INVENTION

This invention generally relates to user interfaces for speech recognition systems, and particularly to a system and method for speech recognition of arbitrarily spoken characters. Another aspect of this invention relates to relaxing constraints specific to remembering words (and their respective pronunciations) corresponding to characters, which is currently required for computerized recognition of spoken characters. Yet another aspect of this invention is that it dramatically improves a speech recognition system's accuracy for recognition of characters (alphabet or alphanumeric) and thus solves the problem associated with recognition of sub-sets of characters that sound similar and thus bear close similarities in the so called acoustic space; for example the E-set in English language (comprising of B, C, D, E, G, P, T, V, Z) and also M, N.

BACKGROUND OF THE INVENTION

The problem of entering text into machines using Voice or Speech has existed for a long time. This problem is of specific importance in many practical situations that include applications involving (1) hands-free and/or eyes-free interaction, (2) landline/cellular telephones, personal-digital-assistants, and other such small form-factor devices where a full-size keyboard is lacking, (3) error-correction of a spoken word (like in speech-recognition-for-dictation systems) using a spelling-mode interface, (4) character-recognition, like data-entry using embedded devices, baggage-ID entry using telephone etc. Furthermore, the problem of entering characters (letters and/or alphanumeric symbols) using speech, as opposed to a keyboard, is of specific importance in "wireless-text-messaging" and/or "wireless-data-entry" applications, where the competing interfaces that currently exist, exhibit high degrees of difficulty-to-use.

Speech recognition of spoken characters has been addressed for a long time, but lacks the desired recognition accuracy. This is primarily due to the existing similarities in acoustics among certain groups of characters. There are many confusable groups of characters. For instance, in English language, the most notable group is the so-called "E-set", which is formed of the letters B, C, D, E, G, P, T, V and Z. Because of the minimal acoustic differences between letter pairs in this E-set, speech recognition of these letters is recognized as being one of the most difficult tasks. Other less confusable groups also present similar problems. Furthermore, the accuracy for recognition of characters is poor, also because the underlying acoustic information in speech waveforms corresponding to the individual characters inherit relatively short durations.

Historically, speech recognition systems have tried to address the above problems by mapping some tags (typically words) to the characters. For instance, the most commonly employed technique is to use the military-alphabet that makes the following mapping: A-Alpha, B-Bravo, C-Charlie, etc. Alternatively, systems also resort to using other forms of mapping like A-for-Alabama, B-for-Boston, C-for-California etc. Further, some systems (see IBM's U.S. Pat. No. 5,995,934, Tang, Nov. 30, 1999) have used techniques like mapping alphanumeric symbols into Chinese idioms or words.

The above user-interface technique of mapping words/tags to characters dramatically improves the accuracy of a speech recognition system. Unfortunately, there are many problems associated with such techniques. Some of these problem include: (1) the users have to memorize/remember these tags which, in almost all real-world applications, is not desirable; (2) the users have to remember/train to pronounce these words/tags in a manner that is well-suited for the specific recognition system; (3) the time it takes to render the speech for these words/tags is large (and depends on the choice of words) compared to the time it takes to simply render speech corresponding to the characters; and (4) the choice of words does not always guarantee optimum separation of the words in the acoustic space. Clearly there is a trade-off between accuracy, speed, and ease of learning, when it comes to designing a user-interface for character recognition.

SUMMARY OF THE INVENTION

This invention is a system and method for speech recognition of spoken characters that is based on simple coding-schemes at the user-interface. In particular, it requires association of each character with a plurality of individually spoken characters in sequence. For instance, in one embodiment, the method involves speaking a character followed by its "N" (note that N denoting length of coding-scheme should not be confused with letter N) subsequent characters like "EFG" in place of "E". Thus, in accordance with this invention, the constraints on users are relaxed, particularly as they are no longer required to remember words/tags (along with pronunciations) corresponding to the characters. Furthermore, the multiple character coding-scheme helps in separating the individual characters that they represent in the acoustic space, with the separation getting better depending on the specific coding-scheme preferred; thus dramatically improving a speech recognizer's accuracy for recognition of characters.

BRIEF DESCRIPTION OF THE FIGURES

FIG. 3 illustrates an example dictionary file that forms a module of a speech recognition engine in different embodiments of the present invention.

DETAILED DESCRIPTION OF THE PREFERRED EMBODIMENT

It will be appreciated by those skilled in the art and others that a typical speech recognition system (also referred to as an Automatic Speech Recognizer or ASR) consists of accessing the audio data through a microphone-soundcard combination, processing the audio using a front-end signal processing module to generate feature-vectors, and subsequently doing pattern-matching in the search module; using knowledge from acoustic-model(s) and language-model(s). The system itself may reside as software or may be implemented on a computing device such as a conventional embedded system; and thus may include memory (ROM, RAM etc.), storage, processors (fixed-point, floating-point etc.), interface ports, and other hardware components.

Figure 1A:
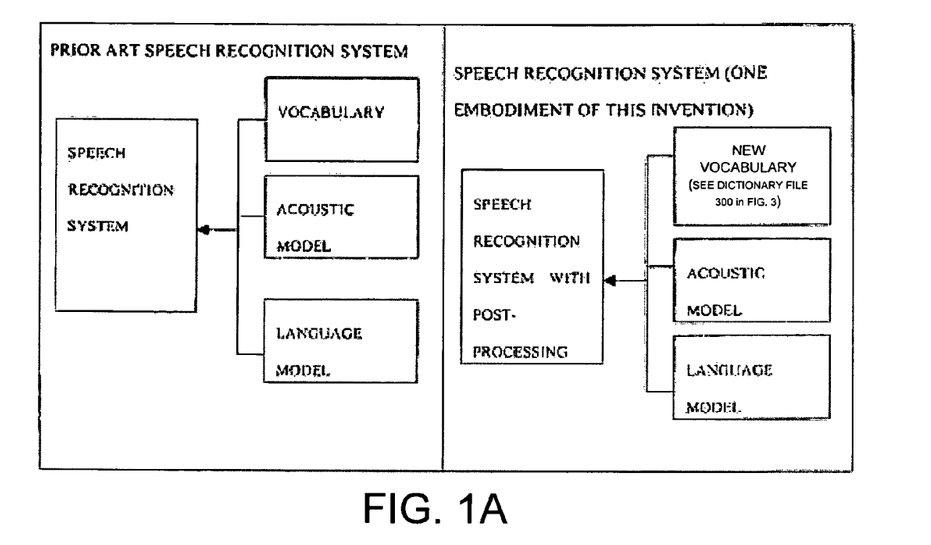
FIG. 1A shows a block diagram that illustrates a prior art speech recognition method in contrast to the present invention's speech recognition method.
Figure 1B:
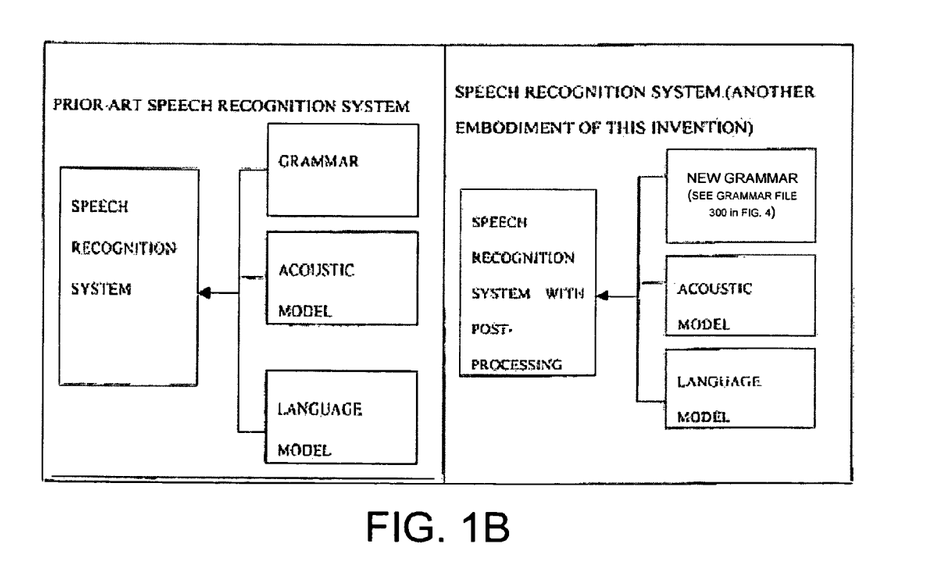
FIG. 1B shows a block diagram that illustrates another prior art speech recognition system in contrast to a different embodiment of the present invention.
Figure 4:
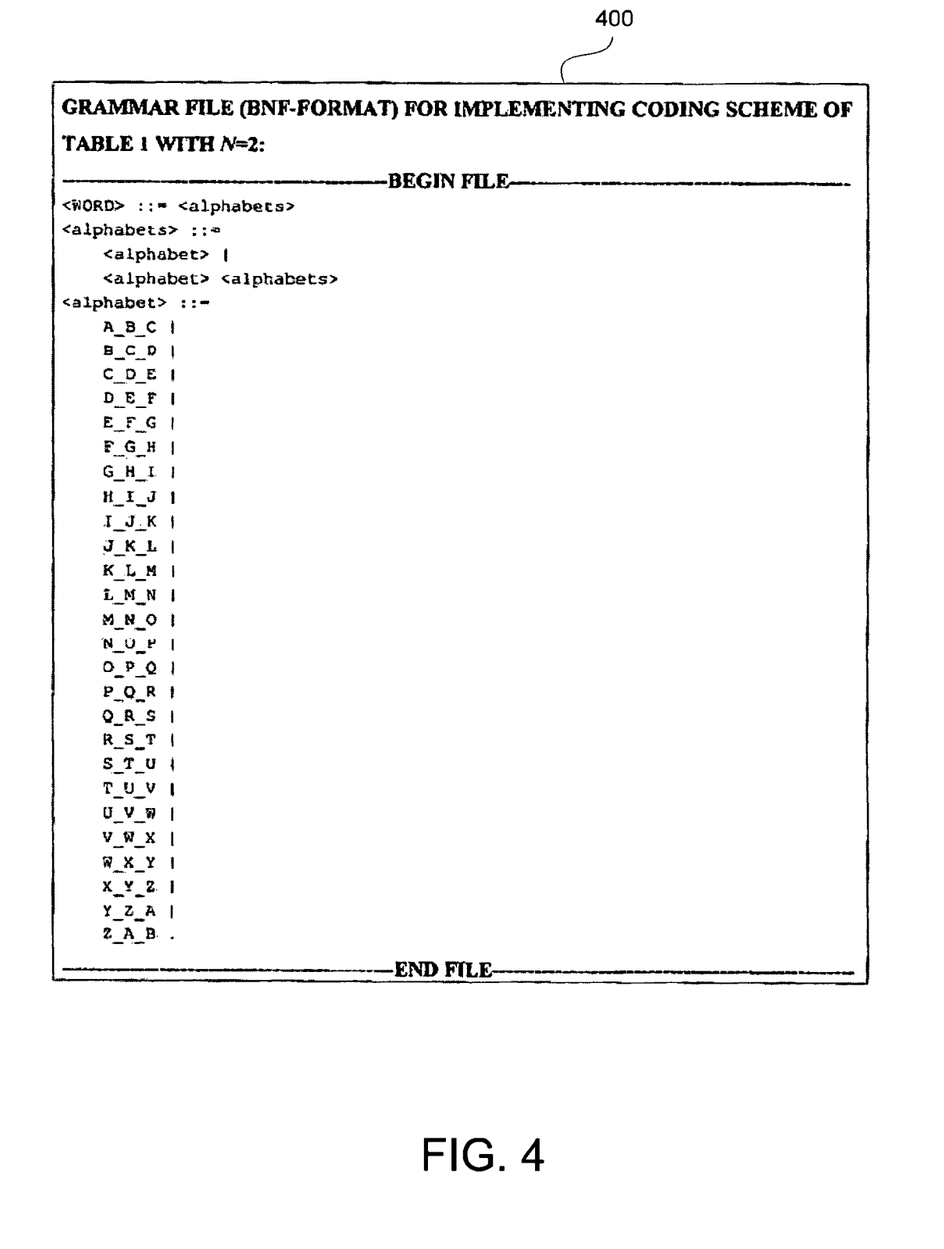
FIG. 4 illustrates an example grammar file in BNF format that forms a module of a speech recognition engine in different embodiments of the present invention.
Figure 5:
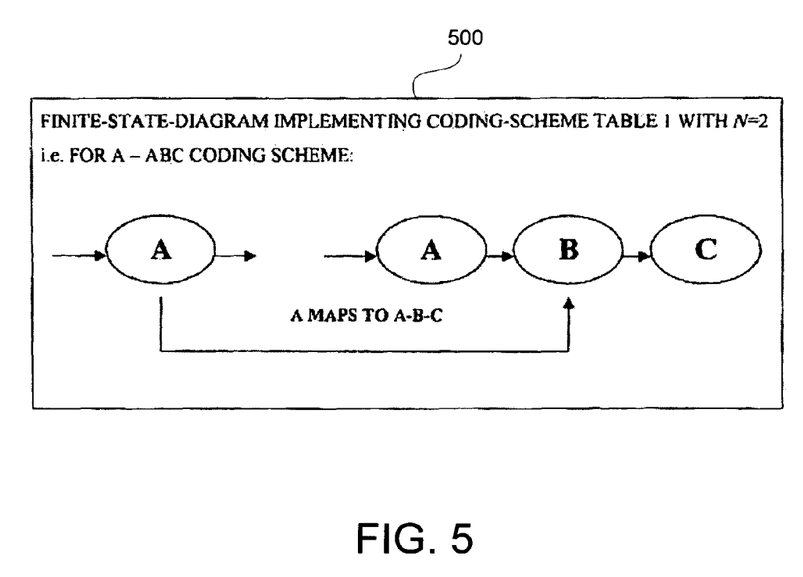
FIG. 5 illustrates an example finite-state-diagram interpretation or a Hidden-Markov-Model state-sequence for implementing an example coding-scheme in different embodiments of the present invention.

In one embodiment of the invention, a speech recognition system for recognizing and interpreting arbitrarily spoken characters (in any character-based language), that relaxes constraints specific to remembering words (and their respective pronunciations) corresponding to characters, is designed by (a) pre-determining a coding/mapping scheme that maps the individual characters to a sequence of characters (by wrapping around at the end of the sequential list of characters) as per TABLE 1, (b) modifying an existing grammar-file (or creating a new grammar-file) for implementing the coding-scheme as per FIG. 4, or modifying a vocabulary-file (or creating a new vocabulary file) that has pronunciations to implement the coding scheme as per FIG. 3 or more generally as shown in FIG. 5, (c) capturing a character as an audio speech signal spoken by a user, (d) recognizing the inputted character by referring to the modified grammar/vocabulary in conjunction with the system's acoustic model and language model, and (e) generating programming code or system module to post-process the recognizer's standard output as shown in TABLE 7, so as to put out the desired output. The resulting system may be visualized as shown in the right side of FIGS. 1A and 1B.

TABLE 1

CODING-SCHEME:

FOR EACH CHARACTER, SPEAK THAT CHARACTER, FOLLOWED BY "N" SUBSEQUENT CHARACTERS;
WRAP AROUND UPON REACHING THE END-OF-LIST.
EXAMPLE:

FOR SPEAKING LETTER "V", SPEAK "VW"; NOTE THAT "V" AND, FOR EXAMPLE, "E" WHICH WERE CONFUSABLE, ARE NOW MAPPED TO "VW" AND "EF" RESPECTIVELY AND ARE LESS CONFUSABLE.

TABLE 1 illustrates one embodiment of a coding-scheme that associates a character with its spoken counterpart.

The present invention also works with other languages, when based on a character sequence, in their native form. The invention similarly can be used with Romanized translators, as in Romanji for Japanese, Pin Yin for Chinese, and Devanagari for Hindu as some examples. The present invention may also be used in conjunction with word completion software programs.

TABLE 2

EXAMPLE OF CODING-SCHEME WITH N = 1 FOR ENGLISH CHARACTERS

A -- AB
B -- BC
C -- CD
D -- DE
E -- EF
F -- FG
G -- GH
H -- HI
I -- IJ
J -- JK
K -- KL
L -- LM
M -- MN
N -- NO
O -- OP
P -- PQ
Q -- QR
R -- RS
S -- ST
T -- TU
U -- UV
V -- VW
W -- WX
X -- XY
Y -- YZ
Z -- ZA
0 -- 01
1 -- 12
2 -- 23
3 -- 34
4 -- 45
5 -- 56
6 -- 67
7 -- 78
8 -- 89
9 -- 90

TABLE 2 illustrates an example of the coding-scheme described in TABLE 1 as applied to the alphanumeric characters of the English Alphabet.

TABLE 3

CODING-SCHEME:

FOR EACH CHARACTER, SPEAK THAT CHARACTER "M" TIMES, FOLLOWED BY "N" SUBSEQUENT CHARACTERS.

TABLE 3 illustrates another coding-scheme that is a variant of the coding-scheme described in TABLE 1.

TABLE 4

EXAMPLE OF CODING-SCHEME WITH M = 1 AND N = 1 FOR ENGLISH CHARACTERS

A -- AAB
B -- BBC
C -- CCD
D -- DDE
E -- EEF
F -- FFG
G -- GGH
H -- HHI
I -- IIJ
J -- JJK
K -- KKL
L -- LLM
M -- MMN
N -- NNO
O -- OOP
P -- PPQ

TABLE 4-continued

EXAMPLE OF CODING-SCHEME WITH M = 1 AND
N = 1 FOR ENGLISH CHARACTERS

Q -- QQR
R -- RRS
S -- SST
T -- TTU
U -- UUV
V -- VVW
W -- WWX
X -- XXY
Y -- YYZ
Z -- ZZA
0 -- 001
1 -- 112
2 -- 223
3 -- 334
4 -- 445
5 -- 556
6 -- 667
7 -- 778
8 -- 889
9 -- 990

TABLE 4 illustrates an example of the coding-scheme described in TABLE 3 as applied to the alphanumeric characters of the English Alphabet.

TABLE 5

MORE EXAMPLES:

1) FOR SPEAKING LETTER "A", SAY "ABCD"
2) FOR SPEAKING LETTER "Z", SAY "ZABC"
3) FOR SPEAKING LETTER "D", SAY "DEFGHI"
4) FOR SPEAKING LETTER "5", SAY "5678"
5) FOR SPEAKING DIGIT "9", SAY "9012"

TABLE 5 illustrates a set of coding-schemes as examples of the coding-scheme described in TABLE 1.

TABLE 6

CODING-SCHEME:

FOR EACH CHARACTER (OR FOR A PRE-DETERMINED
SUB-SET OF CHARACTERS), SPEAK THAT CHARACTER,
FOLLOWED BY THE WORD "AS IN" OR "FOR", FOLLOWED
BY THAT CHARACTER AND ITS "N" SUBSEQUENT
CHARACTERS; WRAP AROUND UPON REACHING THE
END-OF-LIST.
EXAMPLE:

FOR SPEAKING LETTER "A", SPEAK "A AS IN
ABC" OR SPEAK "A FOR ABC"; USE THIS CODE FOR
SPEAKING A, B, C, D, E, G, P, T, V, Z; ALL OTHERS CAN BE
SPOKEN AS THEIR ORIGINAL AND INDIVIDUAL CHARACTER.

TABLE 6 illustrates another embodiment of a coding-scheme in accordance with this invention.

FIG. 3 illustrates a dictionary file 300 (in ASCII which may be compiled to be in binary for real-time execution) that forms a module of a speech recognition engine, for implementing an example of the coding-scheme in TABLE 1.

FIG. 4 illustrates a grammar file 400 in BNF format (other formats may be easily used as would be appreciated by one skilled in the art and others) that forms a module of a speech recognition engine, for implementing an example of the coding-scheme in TABLE 1 or modifying a vocabulary-file (or creating a new vocabulary file) that has pronunciations to implement the coding-scheme as per FIG. 3, FIG. 5 illustrates a more general finite-state-diagram 500 interpretation or a Hidden-Markov-Model state-sequence for implementing the coding-scheme in TABLE 1 with N=2 (i.e., for A-ABC coding-scheme).

TABLE 7

POST-PROCESSING STEP (COULD BE DONE AT THE
LEVEL OF THE RECOGNIZER'S SEARCH MODULE OR
AT THE LEVEL OF THE API-INTERFACE):

---------------------------PSEUDO-CODE---------------------------
GET THE OUTPUT OF THE RECOGNIZER.
FOR EACH WORD,
    STRIP ALL CHARACTERS BEGINNING FROM THE
    UNDERSCORE TILL THE
END
END
// EXAMPLE: A_B_C SHOULD BECOME A AFTER
THE ABOVE PROCESSING
------------------------------------------------------------------

TABLE 7 illustrates post-processing step (which basically decodes the coded characters back to their original form) required to implement the coding-scheme as used in FIG. 4/FIG. 3.

Notice that the speech recognition system described above results in improved accuracy for the specific task of character-recognition, especially so when the characters exhibit high degrees of acoustic similarities; like the E-Set in English language. Additionally, special techniques may be employed to build and/or adapt acoustic models and language models, that exploit the coding scheme used, so as to further improve the systems performance; for instance collecting corpus of acoustic training/adaptation/test data (speech samples) where the speakers are specifically instructed to speak using the coding-scheme.

Observe that the above system may also be used to improve accuracy in noisy environments, by selecting the parameter "N" (in TABLE 1) which determines the code-length of the coding scheme, based on the known signal-to-noise ratio. More generally, the coding scheme proposed in this invention has the properties of noise robustness, discrimination in the acoustic space, ease-of-learning, and user-friendliness.

Figure 2:
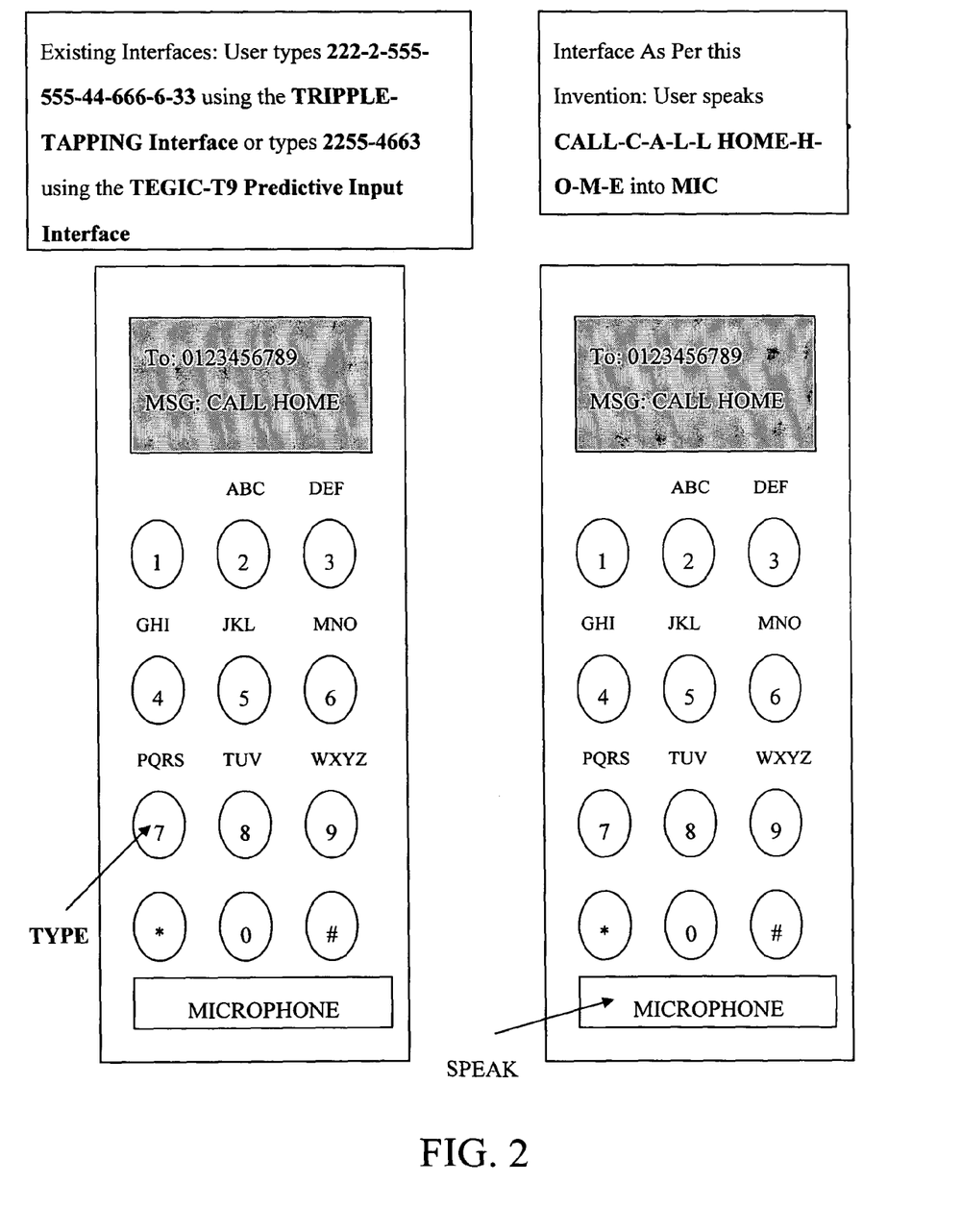
FIG. 2 illustrates a wireless text messaging application using the interface described in the present invention; real-time and audible feedback may be included.

Clearly, a user-interface in accordance with this invention has the advantage of being easy-to-adapt by anyone who can speak and type naturally the characters that they wish to dictate. It allows users to conveniently dictate any arbitrary text (by speaking characters into devices) in eyes-busy, hands-busy situations like "driving an automobile". The user-interface may also be used for correcting errors (and/or entering new words) of a general-purpose speech recognition system. As depicted in FIG. 2, the invention may be naturally viewed as a method/apparatus for dictating short text messages, as in text-messaging, into small form-factor embedded devices like cellular phones, using real-time visual and audible feedback. Observe that the proposed interface is faster, more intuitive, and may be used in eyes-busy-hands-busy conditions and hence may be more useful compared to existing interfaces (like "Triple Tapping" where to enter a character "C" user has to tap the key "2" three times).

FIG. 2 illustrates the prior art of the "triple tapping" (the left side of the figure) method as compared to one embodiment of the present invention (the right side of the figure). This application of the present invention for "text-messaging" allows a handset to be either viewed as a multi-modal interface that complements the existing "keypad" interface or as the only interface in certain situations like "while driving a vehicle". Since the handset is capable of visual displays giving visual feedback and audio speakers allowing audio feedback, both feedback methods made be used to give the user useful information as to the text inputted using the present invention.

TABLE 8 shows an embodiment of the invention where the two subsequent letters of the text letter to be inputted are used. These subsequent letters are wrapped around the alphabet in the case of "Y" and "Z" as shown. Numbers "8" and "9" are also shown as being wrapped around the Arabic number system sequence.

TABLE 8

CODING-SCHEME:
FOR EACH CHARACTER, SPEAK THAT CHARACTER, FOLLOWED BY "N" (example N = 2) SUBSEQUENT CHARACTERS; WRAP-AROUND ON REACHING END-OF-LIST; POST-PROCESS OUTPUT OF RECOGNIZER A--ABC
B--BCD
C--CDE
D--DEF
E--EFG
F--FGH
G--GHI
H--HIJ
I--IJK
J--JKL
K--KLM
L--LMN
M—MNO
N—NOP
O—OPQ
P—PQR
Q—QRS
R—RST
S—STU
T—TUV
U—UVW
V—VWX
W—WXY
X—XYZ
Y--YZA
Z--ZAB
0--012
1--123
2--234
3--345
4--456
5--567
6--678
7--789
8--890
9--901

While the preferred embodiment of the invention has been illustrated and described, it will be appreciated that various changes can be made therein without departing from the spirit and scope of the invention.

I claim:

1. A computer-implemented method for recognizing a desired spoken character on a computing device, the method comprising:
   a) receiving a spoken character and at least one subsequent spoken character via a microphone on the computing device, the spoken character and the subsequent spoken character being from an alphabet, the subsequent spoken character being in a specified relationship to the spoken character within the alphabet;
   b) using a speech recognition system on the computing device to determine a desired character based on the spoken character and a predetermined number of said subsequent spoken characters, wherein the subsequent spoken characters are consecutive letters in the alphabet; and
   c) outputting the desired character.

2. The computer-implemented method of claim 1 wherein outputting comprises displaying text corresponding to the desired character on a user-interface of the computing device.

3. The computer-implemented method of claim 2 further comprising generating an audio pronunciation of the text of the desired character displayed.

4. The computer-implemented method of claim 2 further comprising displaying several desired characters to form a string, wherein a portion of the string comprises at least one word.

5. The computer-implemented method of claim 4 wherein the string comprises a text message.

6. The computer-implemented method of claim 5 further comprising wirelessly communicating the text message to another computing device capable of displaying the text message.

7. The computer-implemented method of claim 4 further comprising determining errors within the string using general purpose speech recognition and allowing a user to correct the errors.

8. The computer-implemented method of claim 1 wherein the alphabet further comprises an alphanumeric alphabet.

9. The computer-implemented method of claim 8 wherein the spoken character comprises a number and the subsequent spoken characters are consecutive numbers in the alphanumeric alphabet.

10. The computer-implemented method of claim 1 wherein the specified relationship comprises the next character in relation to the spoken character in the alphabet.

11. A computer-implemented method for recognizing a desired character that is spoken, the method comprising:
    a) receiving, via a microphone, a spoken character correlating to the desired character;
    b) receiving at least one subsequent spoken character via the microphone, the subsequent spoken character being a consecutive character in a sequence of characters that define an alphabet for a language; and
    c) determining the desired character, via a speech recognition system, based on the spoken character and the at least one subsequent spoken character, the number of subsequent spoken characters being predetermined for the desired character.

12. The computer-implemented method of claim 11, wherein the language comprises an alpha-numeric language and the consecutive character comprises a first letter in the alpha-numeric language when the desired character is the last letter in the alpha-numeric language.

13. The computer-implemented method of claim 11, wherein the language comprises an alpha-numeric language and the consecutive character comprises a first digit in the alpha-numeric language when the desired character is the last digit in the alpha-numeric language.

14. The computer-implemented method of claim 11, wherein the predetermined number is two and the first subsequent spoken character follows the desired character and the second subsequent spoken character follows the first subsequent spoken character in the alphabet.

15. The computer-implemented method of claim 11, further comprising displaying text corresponding to the desired character.

16. The computer-implemented method of claim 15, further comprising generating an audio pronunciation for the text.

17. The computer-implemented method recited in claim 11, further comprising iteratively repeating steps (a), (b), and (c) a plurality of times until an entire word is identified.

18. A speech recognition system implemented on a computing device, comprising:
   a) a language model module for implementing a coding scheme;
   b) an acoustic model module associated with the coding scheme, the coding scheme associates a desired character with the desired character along with at least one subsequent character, the subsequent character being a consecutive character in a sequence of characters that define an alphabet for an alpha-numeric language;
   c) a receiving module that interacts with a microphone on the computing device for receiving a spoken character and at least one subsequent spoken character; and
   d) a processing module that interacts with the computing device for decoding the spoken character and the subsequent spoken character into the desired character based on the coding scheme.

19. The speech recognition system of claim 18, wherein a number of subsequent characters for the desired character is predetermined.

20. The speech recognition system of claim 18, further comprising a display for displaying text corresponding to a string of desired characters.

21. The speech recognition system of claim 18, further comprising an audio module that interacts with a soundcard of the computing device for generating an audio pronunciation of the text.

* * * * *